Patented Oct. 19, 1948

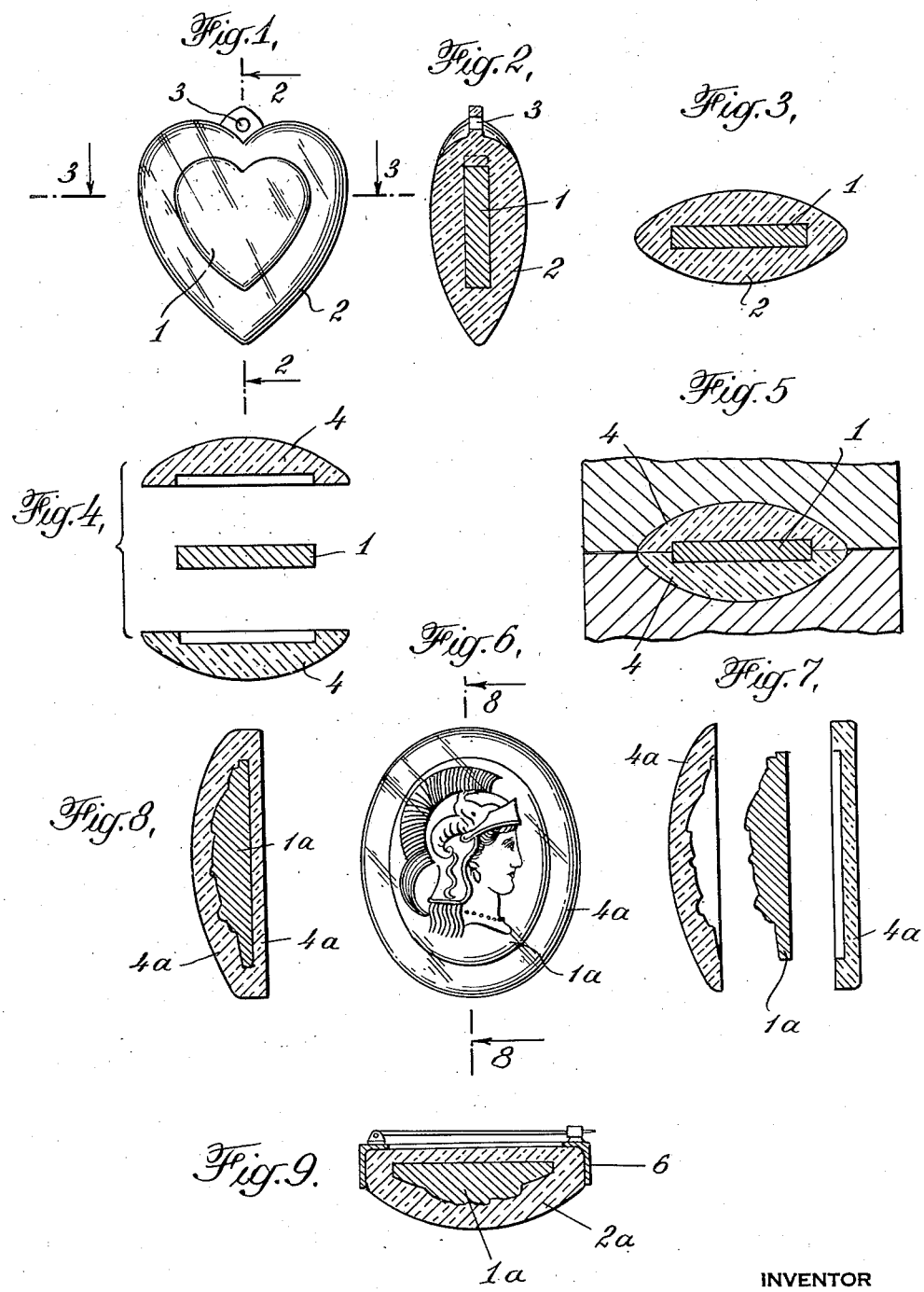

2,451,913

UNITED STATES PATENT OFFICE 2,451,913

PLASTIC ORNAMENTAL ARTICLE

Walter J. Brice, White Plains, N. Y.

Application October 5, 1945, Serial No. 620,585

1 Claim. (Cl. 41—10)

This invention relates to molded plastic articles and methods of making the same and has for its object to provide novel and attractive articles, such as costume jewelry and the like, which may be cheaply made from any suitable thermoplastic material.

The novel article which is the subject matter of this application consists of an inner object, such as a medallion or piece of carving, completely enclosed in a homogeneous outer covering of transparent plastic molded to any desired shape and completely free of joints of any description. Articles of this type, that is, consisting of an ornament enclosed in a transparent covering, have long been popular but as heretofore made the transparent outer portion consisted of separate parts, joined together by cement or in some other manner, which detracted from the appearance of the finished article. Also, the manufacture of such articles by processes heretofore known involved considerable labor so that such articles have heretofore been in the category of hand-made articles and were priced accordingly.

According to the present invention articles of this type can be made on a quantity basis within relatively insignificant labor costs but are, nevertheless, of superior quality and more attractive appearance than articles of this type as made by the processes heretofore in vogue.

In the accompanying drawings I have illustrated typical articles embodying my invention and the successive steps in the preferred process of manufacture. In these drawings:

Fig. 1 shows in elevation a popular type of article embodying my invention;

Figs. 2 and 3 are sections on lines 2—2 and 3—3 respectively of Fig. 1;

Fig. 4 shows in section the several parts of which the article shown in Fig. 1 is made;

Fig. 5 shows the parts assembled for the final molding operation;

Fig. 6 shows in elevation a somewhat different type of article embodying my invention;

Fig. 7 shows in section the several original parts of the article of Fig. 6;

Fig. 8 is a section on line 8—8 of Fig. 6; and

Fig. 9 shows in section an article of jewelry made from the article of Fig. 6.

The article illustrated in Fig. 1 consists of a purple heart 1, enclosed in a transparent plastic covering 2 molded with an eyelet 3 to receive a ring or chain so that the article may be worn as a pendant. The inner core 1 is preferably made of colored thermoplastic of the same composition as the transparent thermoplastic covering 2.

As shown, the inner core 1 is a flat disk, cut or stamped from a sheet of thermoplastic material, but the inner core may, of course, be molded to shape if desired. The core may be made of other suitable material, such as a previously molded thermosetting plastic, glass, stone or, in fact, any substance which will not be adversely affected by the final molding step hereinafter described.

The thermoplastic envelope 2 is formed initially in two symmetrical halves such as illustrated at 4 in Fig. 2. Synthetic resins of the methyl methacrylate type are suitable materials for the outer envelope, the two halves being molded from a molding powder of such material now sold on the market under various trade names. Also, of course, the outer surface of the two halves 4 is molded to the shape it is to have in the final finished article. The two halves 4 with the enclosed core 1 are then assembled as shown in Fig. 3 and placed in a mold which is the exact replica of the finished article. The mold is then heated to a temperature above the melting point of the molded thermoplastic material constituting the envelope, so that the two halves melt together and all trace of the division between the two halves disappears.

The mold is preferably slightly smaller than the assembled parts so that when the two parts of the mold are brought together as shown in Fig. 5 the material in the mold will be under compression. When so held the mold may be heated to an extent such that the core 1, if of the same material as the envelope, will be melted and fuse with the envelope to form a solid unitary piece having a colored center portion of the exact shape and dimensions as the original core 1. Due to the uniform pressure under which the parts are held together on the mold there is no relative movement of the colored core and the transparent envelope and there is a sharply defined line of demarcation between the colored center and the transparent envelope. Due, however to the fact that the colored center and the transparent envelope are the same material and in the finished article are fused together in a single unitary piece, there is no refraction of the light as it passes from the transparent envelope and the colored center. Hence, any design which may be impressed or molded on the face of the core 1 will be substantially invisible when viewed in ordinary diffused light. Such design, however, can be seen when illuminated by a beam of light so directed as to be reflected from the surface of the colored portion to the eye.

In Figs. 6 to 9 inclusive, I have shown a somewhat different type of article from that shown in Figs. 1 to 5 inclusive. As here shown the enclosed article 1ª is a bas relief having a carved face on one side and with the other side flat. The core 1ª is of a different material from the outer envelope. For example, the core may be molded from a thermosetting plastic, which when set will have a higher melting point than the thermoplastic envelope. The two portions 4ª which form the outer envelope 2ª are recessed as shown in Figs. 7 and 8 to fit the respective faces of the core piece 1ª. The pieces are assembled as shown in Fig. 8 and heated in a mold at sufficient temperature to melt the thermoplastic material forming the halves 4ª so that they will melt together and form a unitary outer envelope completely enclosing the internal core 1ª. Due to the difference in material the light will be refracted at the interface between the core and the envelope and the surface contour of the core will stand out sharply.

The core may, of course, be made of various materials such as glass, stone, and the like, which may be molded, carved, or otherwise formed to the desired contour. The core may then be used to form molds for the two halves of the envelope so that the cavity in the assembled envelope will be the exact counterpart of the core.

The article shown in Fig. 6 forms an attractive piece of costume jewelry which, for example, may be mounted in a setting 6 having a pin or clasp for attachment to the costume.

Of course it will be understood that the core may be made up of more than one piece, for instance a cameo effect may be produced by forming the core of a flat disk of one color, constituting the background, and a molded head, or the like, of a differently colored material. The separate parts will be held in place by the corresponding cavities initially formed in the two halves of the invention.

In selecting material for the inner core it is desirable that the specific gravity of the material out of which the core is made is reasonably close to the specific gravity of the transparent outer envelope, so that there will be no tendency for the core to settle during the final step of melting the two halves together. However, the thermoplastic resins which are preferably used for the outer envelope are quite viscous even when melted sufficiently to form a completely unitary enclosure, and unless the difference in specific gravity is considerable there will be no movement of the core during the final molding operation.

As the halves of the remote plastic envelope 2 are provided with a cavity to receive the core 1, the core in all like articles will be identically positioned with respect to the outer surface of their respective envelopes. This is highly desirable where the ornamental articles are used in sets, such as earrings, buttons and the like.

It will be understood, of course, that the articles illustrated have been selected by way of example only, and that the invention is not limited to the production of such articles, or otherwise, except as specified in the appended claim.

I claim:

An ornamental article comprising a three-dimensional core of substantial thickness embedded in a homogeneously unitary body of a transparent plastic of a contrasting color, said core being in a predetermined relation to the outer surface of the enclosing body of plastic as a result of the article having been formed by the uniting of a plurality of parts at least one of which had a pre-formed cavity in a surface to be joined to another part in which the core had been placed, whereby said article is identical with similar articles so formed.

WALTER J. BRICE.

REFERENCES CITED

The following references are of record in the file of this patent:

UNITED STATES PATENTS

| Number | Name | Date |
| --- | --- | --- |
| 235,799 | Naylor | Dec. 21, 1880 |
| 696,354 | Richards | Mar. 25, 1902 |
| 1,441,315 | Walbridge | Jan. 9, 1923 |
| 2,090,837 | Gould | Aug. 24, 1937 |
| 2,350,421 | Schoder et al. | June 6, 1944 |
| 2,358,259 | Siedschlag et al. | Sept. 12, 1944 |
| 2,364,870 | Otto | Dec. 12, 1944 |
| 2,379,793 | Eenigenburg | July 3, 1945 |